April 13, 1965      V. F. GUSTIN      3,178,143
TRIPOD
Filed July 2, 1963
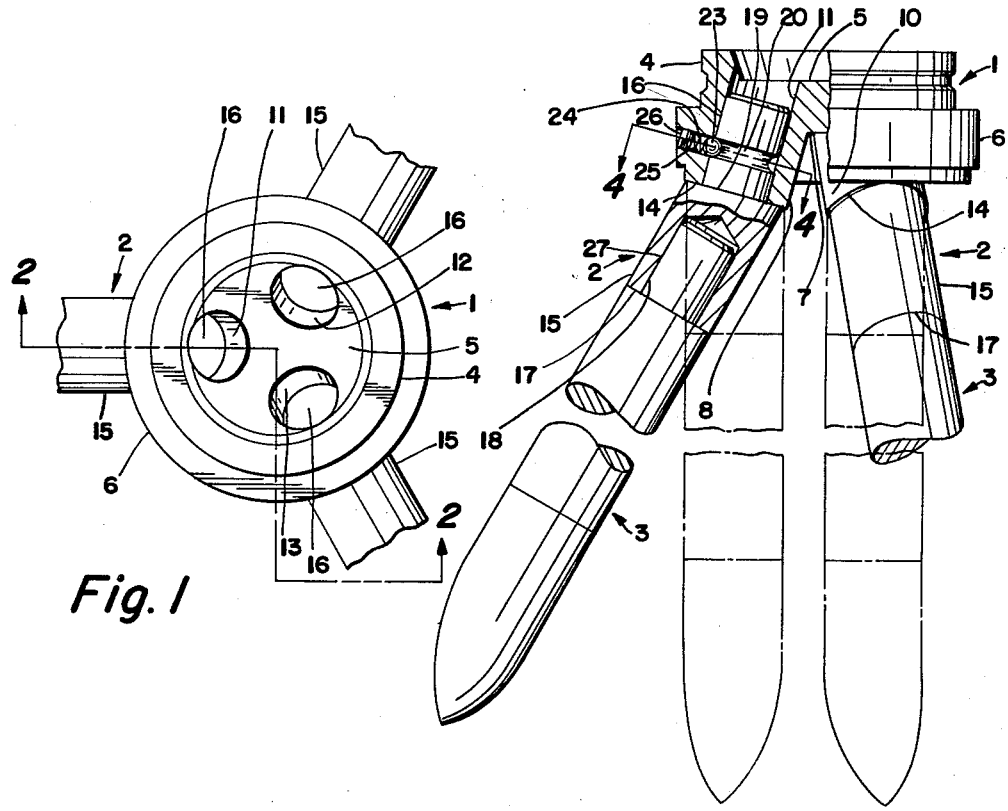
Fig. 2
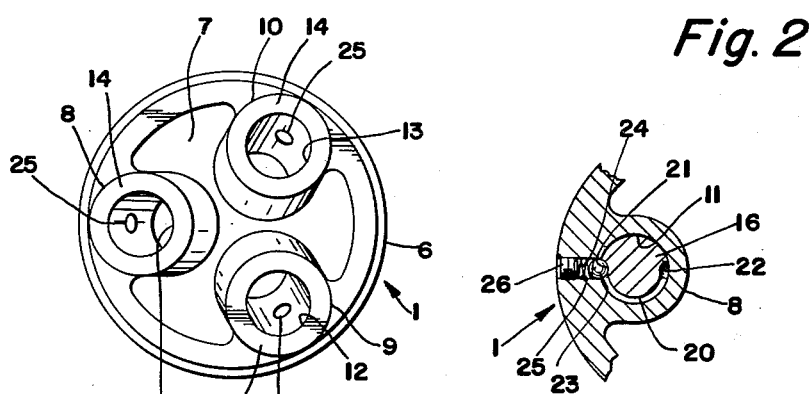
Fig. 1
Fig. 3
Fig. 4
INVENTOR.
VICTOR F. GUSTIN
BY
ATTORNEYS

United States Patent Office

3,178,143
Patented Apr. 13, 1965

3,178,143
TRIPOD
Victor F. Gustin, 6570 Glenwillow Drive,
North Royalton, Ohio
Filed July 2, 1963, Ser. No. 292,265
3 Claims. (Cl. 248—168)

This invention relates generally to tripods.

A primary object of the invention is to provide a tripod which consists of a minimum number of easily assembled parts, of simple construction, and in which the legs are movable to operative and inoperative position by a simple limited rotary movement of the legs about their own axes.

Another object of the invention is to provide a tripod of the character described, which embodies adaptors which have parts which are disposed angularly to each other, whereby rotation of the adaptors about the axes of one of the parts is effective to move the legs of the tripod to operative and inoperative position.

A further object of the invention is to provide a tripod of the character described, in which the legs, when collapsed, are disposed within the external dimensional limits of the base or pedestal of the tripod.

A still further object of the invention is to provide a tripod of the character described, embodying novel means for locking the adaptors or legs to the base or pedestal of the tripod.

Other objects and advantages of my invention will be apparent during the course of the following description.

In the accompanying drawings forming a part of this specification, and in which like numerals are employed to designate like parts throughout the same, FIG. 1 is a fragmentary top plan view of the tripod, with the legs in extended or operative positions;

FIG. 2 is a view, partly in section and partly in elevation, taken on the line 2—2 of FIG. 1;

FIG. 3 is a bottom plan view of the base or pedestal of the tripod, and

FIG. 4 is a fragmentary cross-sectional view, taken on the line 4—4 of FIG. 2.

Referring more particularly to the drawings, there is illustrated a tripod comprising a pedestal or base generally designated by reference numeral 1, and support members comprising leg adaptors, generally designated by reference numerals 2, and leg portions, generally designated by reference numeral 3.

The pedestal or base 1 is preferably made in the form of a single casting of aluminum or like metal, and consists of an upper annular portion 4 having a recess 5 therein, and a lower annular portion 6, of greater external diameter than that of the portion 4, and having a recess 7 therein.

The pedestal or base 1 is designed for the support of a camera or other photographic equipment, for supporting a telescope, for supporting a surveying instrument, and for supporting other articles.

The pedestal or base 1 is provided, at points spaced circumferentially 120 degrees apart, with tubular extensions 8, 9 and 10, which provide sockets or openings 11, 12 and 13 respectively, for a purpose to be presently described, these sockets or openings extending entirely through the base 1, as shown in FIG. 2. The extensions 8, 9 and 10 terminate, at their lower ends, in annular bearing surfaces 14, which lie in a plane 90 degrees to the axis of the extension.

The axes of the sockets or openings 11, 12 and 13, in this instance, diverge outwardly and downwardly at an angle of 15 degrees to the axis of the base or pedestal 1, but it is to be understood that this angle may vary, depending on the use which is to be made of the tripod, and the desired degree of angulation of the leg positions 3.

Each of the adaptors 2 is similarly preferably made as an aluminum casting, and consists of a lower tubular portion 15, and an upper post-like element or extension 16. The tubular portion 15 has a lower edge 17 which is disposed in a plane normal to the axis of the portion 15, and has a socket 18 which extends upwardly from said plane. The tubular portion 15 terminates at its upper end in a surface 19 which is inclined to the axis of the portion 15, and from the central portion of which the post-like element 16 extends. The angle of inclination of the axis of the element 16 to the axis of the portion 15 of the adaptor is substantially equal to the aforesaid angle of divergence of the sockets or openings to the vertical axis of the pedestal, which in this instance is 15 degrees.

The post-like element or extension 16 of the adaptor 2 is provided in its exterior surface with a groove 20, the base of which is of arcuate cross-section, said groove extending approximately for 180 degrees of the surface of the element 16, and having terminal ends 21 and 22, in the form of spherical sockets, for a purpose to be presently described.

The elements 16 of the adaptors 2 are received in the openings 11, 12 and 13 of the base 1, in the manner shown in the drawings, that is to say, with the surfaces 19 in engagement or abutment with the bearing surfaces 14 of the extensions 8, 9 and 10.

For the purpose of retaining the elements 16 of the adaptors in the openings 11, 12 and 13, and against axial displacement from these openings, balls 23 are provided, which are urged into the grooves 20 by means of compression coil springs 24. The balls 23 and springs 24 are disposed in openings 25 which extend through the base 1, in a direction radially-outwardly from the walls of the sockets or openings 11, 12 and 13. These balls and springs are retained in the openings 25 by means of set screws 26 which are threadedly secured in the outer ends of the openings 25.

The sockets 18 of the adaptors 2 are designed to receive the upper ends 27 of the leg portions 3.

With the support members in their operative or open positions, as shown in solid lines in the drawings, the axes of the leg portions 3 and tubular portions 15 of the adaptors are at an outwardly diverging angle of 15 degrees to the axes of the tubular extensions 8, 9 and 10 which in turn are at an outwardly diverging angle of 15 degrees from the vertical axis of said pedestal. Thus, the angle of divergence of the leg portions 3 from the vertical axis is the cumulative total of the aforesaid substantially equal angles, or twice 15 degrees in this instance. In this position of the support members, the balls 23 are disposed in the spherical sockets 21 at one end of the grooves 20, the tension of the springs 24 being sufficient to lock the elements 16 against rotation in the openings 11, 12 and 13, except by manual rotation of the adaptors.

When it is desired to move the support members to their collapsed or inoperative positions, as shown in broken lines in FIG. 2 of the drawings, the adaptors are rotated 180 degrees, in a clockwise direction, as viewed in FIG. 1, until the balls 23 snap into the spherical sockets 22 at the other ends of the grooves 20, thereby locking the elements 16 against rotation in the openings 11, 12 and 13, except by manual rotation of the adaptors. In the closed or collapsed position of the support members, the axes of the portions 15 and the leg portions 3 are parallel with the axis of the base 1, so that the tripod occupies a minimum of space for storage or transportation purposes.

When it is again desired to move the support members to their open or operative position, the adaptors are merely rotated 180 degrees, in a counter-clockwise direction, as viewed in FIG. 1.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. A collapsible tripod comprising a pedestal having a vertical axis, said pedestal provided with circumferentially spaced circular openings having axes diverging downwardly at an acute angle to said vertical axis of said pedestal, said tripod further comprising support members movable between operative and collapsed positions, said support members each comprising an elongated leg portion and an angularly related extension disposed within each said opening, said leg portion being inclined to the axis of said extension at substantially the same angle as said angle of divergence of said openings from said vertical axis of said pedestal, each said extension being rotable within its associated opening to permit said support members to be moved between said operative and said collapsed position in each of which positions said leg portions and said extensions are disposed within planes including said vertical axis, said leg portions in said operative position diverging downwardly from said vertical axis at an angle substantially twice the aforesaid angle of divergence of the pedestal openings and in said collapsed position disposed substantially parallel to said vertical axis.

2. A tripod, as defined in claim 1, in which said extensions are provided in their outer surfaces with grooves extending partially around said surfaces, and said pedestal is provided with spring-pressed balls urged into said grooves.

3. A tripod, as defined in claim 2, in which said grooves extend approximately 180 degrees around said surfaces and terminate at their ends in spherical sockets which receive said balls.

References Cited by the Examiner
UNITED STATES PATENTS

| | | | |
|---|---|---|---|
| 1,448,171 | 3/23 | Waderlow | 108—116 |
| 1,502,528 | 7/24 | Reulbach | 279—113 |
| 1,524,973 | 2/25 | Hazelton | 248—168 |
| 1,761,943 | 6/30 | Summers et al. | 251—337 |
| 2,188,237 | 1/40 | Weaver | 248—168 |
| 2,330,105 | 9/43 | Barrows | 248—351 |
| 2,587,511 | 2/52 | Nerman | 248—168 |
| 2,694,542 | 11/54 | Barbakoff | 248—168 |

CLAUDE A. LE ROY, *Primary Examiner.*